US007168319B2

(12) United States Patent  
Dalla Piazza et al.

(10) Patent No.: US 7,168,319 B2
(45) Date of Patent: Jan. 30, 2007

(54) ANGULAR SPEED MEASURING TRANSDUCER

(75) Inventors: Silvio Dalla Piazza, St-Imier (CH); Bruno Studer, Riedholz (CH)

(73) Assignee: Eta SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 11/303,984

(22) Filed: Dec. 19, 2005

(65) Prior Publication Data

US 2006/0130579 A1    Jun. 22, 2006

(30) Foreign Application Priority Data

Dec. 20, 2004 (EP) ................... 04106712

(51) Int. Cl.
G01P 9/04 (2006.01)
(52) U.S. Cl. ..................... 73/504.16; 310/370
(58) Field of Classification Search ............ 73/504.16, 73/504.12; 310/370
See application file for complete search history.

(56) References Cited

U.S. PATENT DOCUMENTS

| | | | | |
|---|---|---|---|---|
| 4,384,232 | A * | 5/1983 | Debely ................. | 310/370 |
| 6,046,531 | A | 4/2000 | Kikuchi et al. | |
| 6,791,243 | B2 * | 9/2004 | Kawashima ............ | 310/370 |
| 6,806,797 | B2 * | 10/2004 | Kikushima ............. | 333/200 |
| 6,894,428 | B2 * | 5/2005 | Tanaya et al. .......... | 310/370 |

| | | | |
|---|---|---|---|
| 2004/0085163 | A1 | 5/2004 | Kikushima |
| 2004/0250261 | A1 | 12/2004 | Fujimoto et al. |

FOREIGN PATENT DOCUMENTS

| | | |
|---|---|---|
| EP | 750 177 A1 | 12/1996 |
| EP | 1 345 008 A2 | 9/2003 |
| JP | 06-112760 * | 4/1994 |

* cited by examiner

Primary Examiner—Helen Kwok
(74) Attorney, Agent, or Firm—Sughrue Mion, PLLC

(57) ABSTRACT

A transducer for measuring an angular velocity formed by a single piezoelectric tuning fork (21) that rotates at said angular velocity, including first (23) and second (24) vibrating legs extending from a base (22), excitation electrodes (25a, 25b, 26a, 26b) arranged on the excitation leg (23), detection electrodes (27a, 27b, 28a, 28b), arranged on the detection leg (24), characterized in that the detection leg includes at least one first groove (33, 34) on the top face and at least one second groove (35, 36) on the bottom face, and in that the detection electrodes include first and second detection electrodes arranged facing each other, the first (27a) respectively the second detection electrode (28a) being arranged on one lateral flank of the groove (33) respectively of the groove (34) such that the electrical field between the first and second detection electrodes is substantially rectilinear through the detection leg, and third and fourth detection electrodes arranged facing each other, the third (27b) respectively the fourth detection electrode (28b) being arranged on one lateral flank of the groove (36) respectively of the groove (35), such that the electrical field between the third and fourth detection electrodes is substantially rectilinear through the detection leg.

8 Claims, 3 Drawing Sheets

Cut I-I

ANGULAR SPEED MEASURING TRANSDUCER

FIELD OF THE INVENTION

The present invention concerns, generally, a transducer for measuring an angular velocity, formed by a single piezoelectric tuning fork that rotates at said angular velocity comprising a base from which an excitation leg and a detection leg extend, and it concerns more specifically the arrangement of the detection electrodes arranged on the detection leg.

BACKGROUND OF THE INVENTION

There is known from the prior art, particularly from EP Patent No. 0 750 177, a gyrometer formed by a single tuning fork having a base from which there extends a first leg on which excitation electrodes are arranged, and a second leg on which detection electrodes are arranged.

FIG. 1 shows an example tuning fork 1 of the type of those that can be used in a gyrometer. Tuning fork 1 shown in longitudinal cross-section in FIG. 1a mainly comprises a base 2 secured to two legs 3, 4, the assembly being made of a piezoelectric quartz material. As shown in transverse cross-section in FIG. 1b, each leg 3, 4 includes electrodes. Excitation leg 3 includes a first pair of excitation electrodes 5a, 5b connected to each other and to which an alternating electric signal is applied at the resonant frequency of the tuning fork in its main plane corresponding to that of FIG. 1a, and a second pair of excitation electrodes 6a, 6b connected to each other and to which an alternating electric signal is applied in phase opposition to that applied to electrodes 5a and 5b. The application of these alternating electric signals excites and consequently causes legs 3 and 4 of tuning fork 1 to vibrate mechanically in a first plane, as indicated by arrows 9. Detection leg 4 includes a first pair of detection electrodes 7a, 7b connected to each other and a second pair of detection electrodes 8a, 8b connected to each other, such pairs converting the mechanical vibrations of the detection leg into an electric signal detected by means of a detection circuit to which said electrodes are connected.

According to tuning fork gyrometer theory, while an excitation signal is being applied to excitation electrodes 5a–5bn, 6a–6b, an angular rotational movement of tuning fork 1 about its longitudinal axis 10 generates a Coriolis force perpendicular to the velocity of the excited leg and to rotational axis 10, and consequently, a vibration in detection leg 4 in a perpendicular plane to the excitation vibration plane, as indicated by arrows 11. This mechanical vibration is converted by the piezoelectric quartz of tuning fork 1 into an electric signal which is detected by the tuning fork detection electrodes 7a–7b, 8a–8b.

One of the main problems observed with this detection electrode arrangement lies in the fact that the electrical path of the field to be detected between two detection electrodes to which an opposite electrical signal is applied, is not rectilinear, and consequently a non-negligible part of the field lines is lost. Consequently, the detection measurement is not optimal.

A theoretically interesting solution would consist in arranging the two pairs of detection electrodes 7a–7b, 8a–8b, as is shown in FIG. 1c. However, this solution has a major drawback, insofar as it requires implementation of a complex manufacturing method that is difficult to control. Indeed, the electrodes present on the lateral faces of the tuning fork are made by an "electrode deposition", which is necessarily carried out over the entire thickness of the lateral face. Thus, it is then very difficult to separate the electrode deposition in two, in order to obtain the two desired distinct electrodes 7b, 8b. Moreover, this type of gyrometer is made in series, i.e. one beside the other. Thus, it is also very difficult to separate the electrode deposition made on the external lateral faces of the tuning fork into two distinct electrodes 7a, 8a.

Moreover, the various aforementioned solutions have an additional drawback, namely the size of the tuning fork, which for such on board gyrometer applications must of course advantageously be as miniature as possible.

SUMMARY OF THE INVENTION

It is one of the main objects of the present invention to overcome the aforementioned drawbacks by making a transducer for measuring an angular velocity in the form of a piezoelectric resonator with a tuning fork having a detection electrode structure that ensures an optimised measurement of the electrical field created in the detection leg while using a manufacturing method that is simple to implement.

Thus, within the scope of the present invention, the detection electrodes are arranged such that, on the one hand, the manufacturing method thereof is simple and that, on the other hand, the electrical field lines detected in the detection leg travel along a substantially rectilinear electrical path between the opposite electrodes through the detection leg. For this purpose, at least one groove is etched on each of the main, top and bottom faces of the detection leg of the tuning fork, which also has the advantage of reducing the size of the tuning fork for the same performance. Thus, the invention concerns a transducer for measuring an angular velocity in accordance with the preamble of the description characterized in that the detection leg includes at least one first groove on the top face and at least one second groove on the bottom face, the first and second grooves each having lateral flanks, and in that the detection means include first and second detection electrodes arranged facing each other, the first detection electrode being arranged on one of the lateral flanks of the first groove, the second detection electrode being arranged such that the electrical field between the first and second detection electrodes is substantially rectilinear through the detection leg, and third and fourth detection electrodes arranged facing each other, the third detection electrode being arranged on one of the lateral flanks of the second groove, the fourth detection electrode being arranged such that the electrical field between the third and fourth detection electrodes is substantially rectilinear through the detection leg.

According to a first preferred embodiment of the present invention, the measuring transducer is characterized in that the detection leg includes a third groove on the top face and a fourth groove on the bottom face, the third and fourth grooves each having two lateral flanks, in that the first, respectively second detection electrode is arranged on one of the lateral flanks of the first, respectively third groove, such that the electrical field is substantially rectilinear between the first and second electrodes through the detection leg and in that the third, respectively fourth detection electrode is arranged on one of the lateral flanks of the second, respectively fourth groove such that the electrical field is substantially rectilinear between the third and fourth detection electrodes through the detection leg.

According to a second embodiment of the present invention, the measuring transducer is characterized in that the second detection electrode is arranged over the entire thickness of a first lateral face of the detection leg such that the electrical field between the first and second detection electrodes is substantially rectilinear through the detection leg, and in that the fourth detection electrode is arranged over the entire thickness of the second lateral face of the detection leg opposite the first lateral face, such that the electrical field between the third and fourth detection electrodes is substantially rectilinear through the detection leg.

Again, for the sake of miniaturisation, mechanical uncoupling means are advantageously provided at the base of the tuning fork, thus further reducing the size of the latter.

BRIEF DESCRIPTION OF THE DRAWINGS

Other features and advantages of the present invention will appear more clearly upon reading the following detailed description of embodiments of the invention, given solely by way of non-limiting example and illustrated by the annexed drawings, in which:

FIG. 1b, already described, is a transverse cross-section I—I of the excitation and detection legs of the tuning fork of FIG. 1a;

FIG. 2b is an enlarged transverse cross-section II—II of the excitation and detection legs of the tuning fork according to FIG. 2a;

DETAILED DESCRIPTION OF THE INVENTION

Figure 1A:
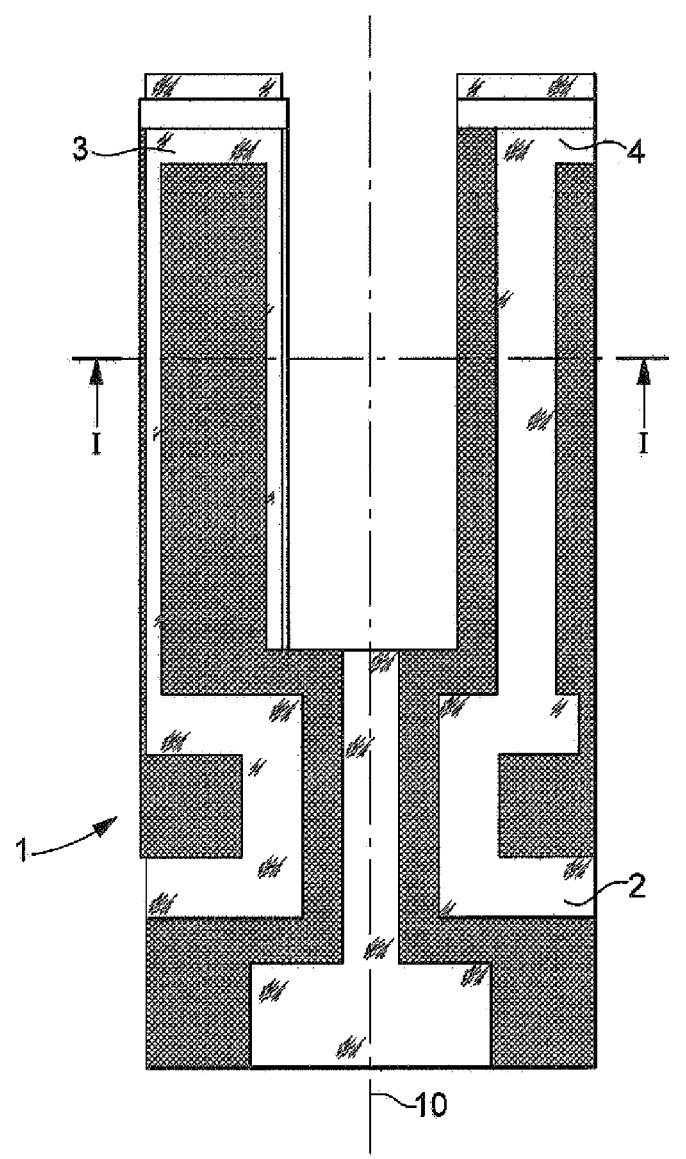
FIG. 1a, already described, is a longitudinal cross-section of a tuning fork like those used in certain gyrometers according to the prior art.
Figure 1B:
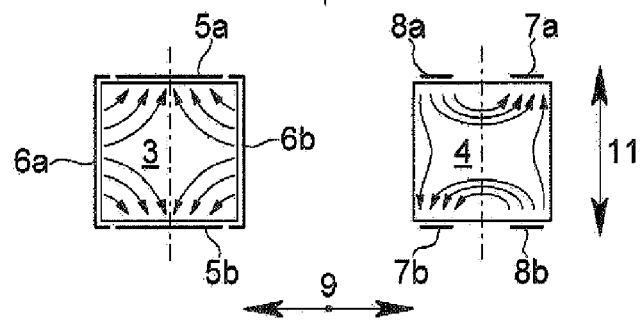
Figure 1C:
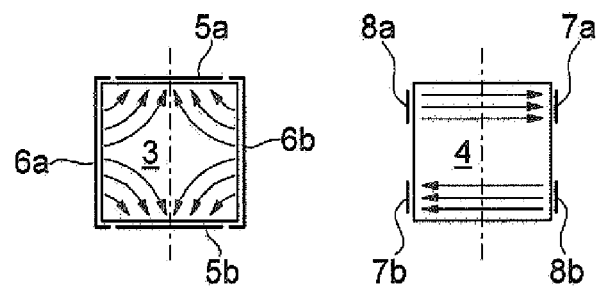
FIG. 1c, already described, is a transverse cross-section of the excitation and detection legs of a tuning fork with an optimised arrangement of the detection electrodes.
Figure 2A:
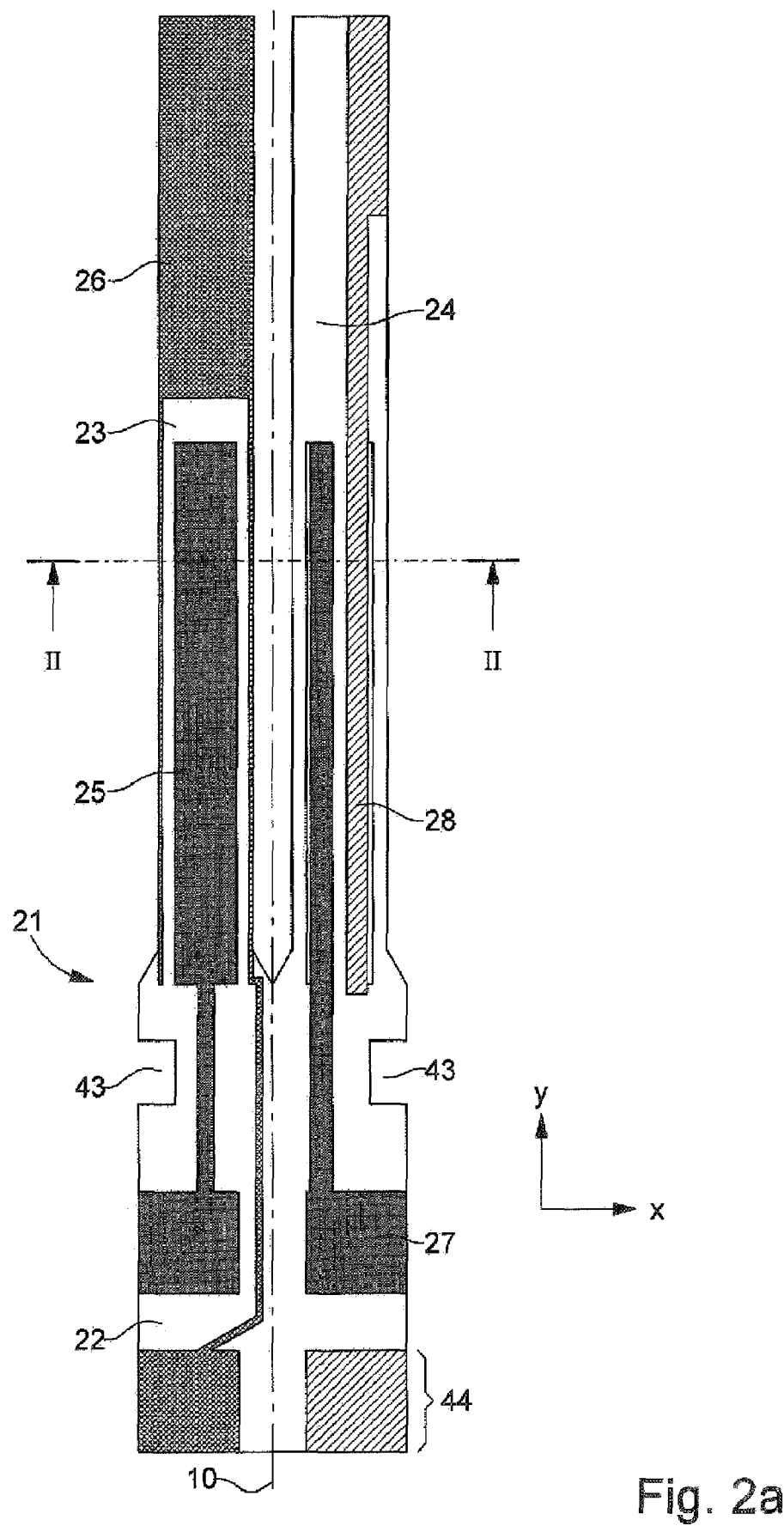
FIG. 2a is longitudinal cross-section of a tuning fork for a gyrometer according to a first embodiment of the invention.
Figure 2B:
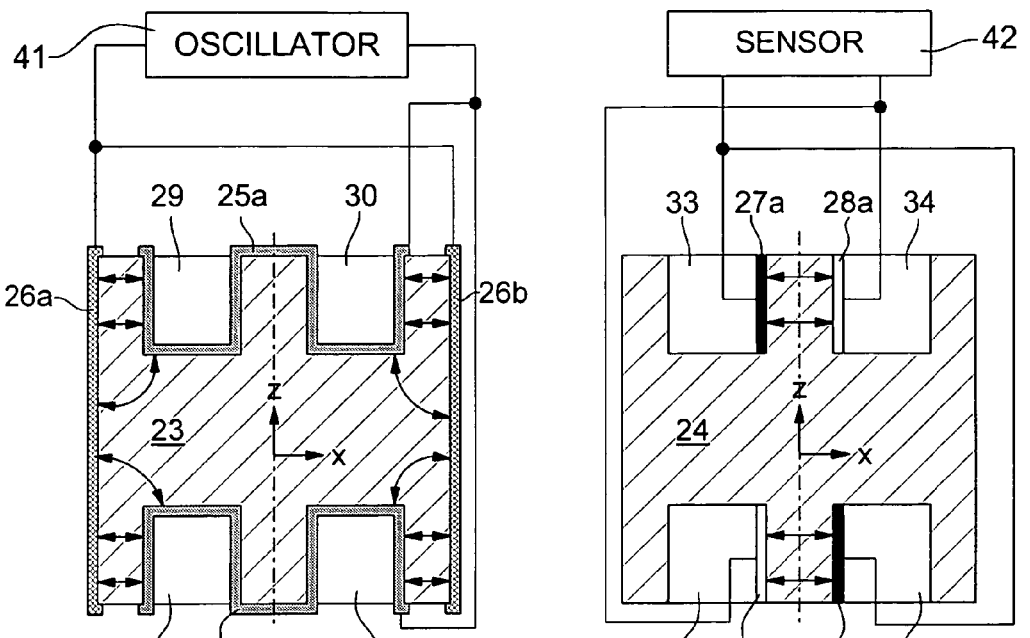

According to a first preferred embodiment of the invention shown in FIGS. 2a and 2b, the device for measuring an angular velocity includes a transducer formed by a single piezoelectric, conventionally quartz, tuning fork 21, for rotating at the angular velocity, formed by a base 22 from which two parallel legs 23, 24 extend, separated by a slot and which each carry conductive depositions forming electrodes of opposite polarity which create and detect an alternating electrical field in the legs, causing and caused by the vibration of the tuning fork by piezoelectric deformation. Each leg 23, 24 has two main top and bottom faces and two lateral faces.

Excitation means 25, 26 are arranged on one of the two legs, called the excitation leg 23, to generate, in response to an excitation signal, a vibration of the transducer at a determined frequency, preferably corresponding to the resonant frequency of the tuning fork in its X-Y plane, in a first direction. In accordance with the example shown in FIG. 2b, which is a transverse cross-section along the axis II—II of FIG. 2a, the excitation means include a first pair of excitation electrodes 25a and 25b or central electrodes arranged respectively on the top and bottom faces of the excitation leg and a second pair of excitation electrodes 26a and 26b, or lateral electrodes arranged respectively over the entire thickness of the one and the other of the two lateral faces of the excitation leg.

The electrodes are provided to be electrically connected in a way that is in itself conventional, central electrodes 25a and 25b to one of the poles of the excitation source and lateral electrodes 26a and 26b to the opposite pole of the excitation source; these connections can largely be achieved by conductive paths deposited on the tuning fork itself. The excitation source has been shown in the example of FIG. 2a in the form of an oscillator 41. During operation, the resonator vibrations can thus be maintained by bending excitation leg 23 of the turning fork, owing to a transverse alternating electrical field in the planes of legs 23, 24.

According to a preferred variant, excitation leg 23 has two grooves 29–30, 31–32 longitudinally hollowed on each of the top and bottom faces of the excitation leg, the depth of the grooves being comprised between 20% and 45% of the thickness of the excitation leg, and preferably of the order of 30%.

The central electrodes 25a, respectively 25b, are arranged so as to cover transversely grooves 29–30, respectively 31–32 etched onto the corresponding face.

This arrangement of the central electrodes in grooves etched into the thickness of the legs increases the piezoelectric coupling. With equal dimensions, the increase causes a decrease in the equivalent resistance of the tuning fork, and thus a decrease in the power consumption of the oscillator which is associated therewith, since for an equal quality factor, this arrangement allows the dimensions of the resonator to be reduced.

Providing grooves on both faces gives a symmetrical leg section, which avoids deformations of the legs outside their plane. The presence of the grooves favours the creation of a homogenous electrical field along electrical axis X of the crystal.

However, one could envisage providing only one groove on each of the top and bottom faces of the excitation leg, in such case the central electrodes transversely cover the single groove present on the corresponding face. Finally, it is also possible to envisage not providing any grooves on the excitation leg.

Referring again to FIGS. 2a and 2b, detection means 27, 28 are provided on the other leg of the tuning fork, called detection leg 24, to generate an electrical detection signal in response to a second vibration of the transducer, due to the first vibration and to the rotation about longitudinal axis 10, having the same determined frequency and in a second direction perpendicular to the first direction. The second vibration includes a useful component whose amplitude is representative of angular velocity.

The gyrometer comprising the tuning fork previously described further includes a suitable measuring apparatus, shown in the form of a detector 42, which will not be described here since the structure thereof depends upon the purpose for which the angular velocity of the transducer is being measured, this measuring apparatus supplying, from the electrical detection signal, a measuring signal representative of angular velocity.

Detection leg 24 includes two grooves 33–34, 35–36 longitudinally etched onto each of the top and bottom faces, each of the grooves having two lateral flanks. The detection means include first 27a and second 28 detection electrodes arranged facing each other, on the top face, the first electrode 27a being arranged on one of the lateral flanks of groove 33 and the second electrode 28a being arranged on one of the lateral flanks of groove 34, such that the electrical path between the two electrodes 27a and 28a is substantially rectilinear through detection leg 24. The detection means also comprise third 27b and fourth 28b detection electrodes arranged facing each other, on the bottom face, the third electrode 27b being arranged on one of the lateral flanks of groove 35 and the fourth electrode 28b being arranged on one of the lateral flanks of groove 36, such that the electrical path between the two electrodes 27b and 28b is substantially rectilinear through detection leg 24. Electrodes 27a and 27b are connected to a first pole of detector 42 and electrodes 28a and 28b are connected to a second pole of detector 42 opposite to the first pole. Thus, detection of the electrical field generated in the detection leg is optimised while providing a simple electrode deposition method similar to that disclosed in EP Patent No. 0 750 177.

By way of example, the depth of the grooves longitudinally etched on each of the top and bottom legs of the detection leg is comprised between 20% and 45% of the thickness of the detection leg, and preferably of the order of 30%.

Again for the sake of miniaturisation, mechanical uncoupling means 37 are advantageously provided between the part 44 securing the base of the tuning fork to the gyrometer and vibrating legs 23, 24. These mechanical uncoupling means can, according to a first variant be formed by notches 43 made in the top part of the base. According to a second variant, not shown here, these mechanical uncoupling means are formed by a hole arranged in the top central part of base 22. A combination of the aforementioned variants can also be envisaged.

Figure 2C:
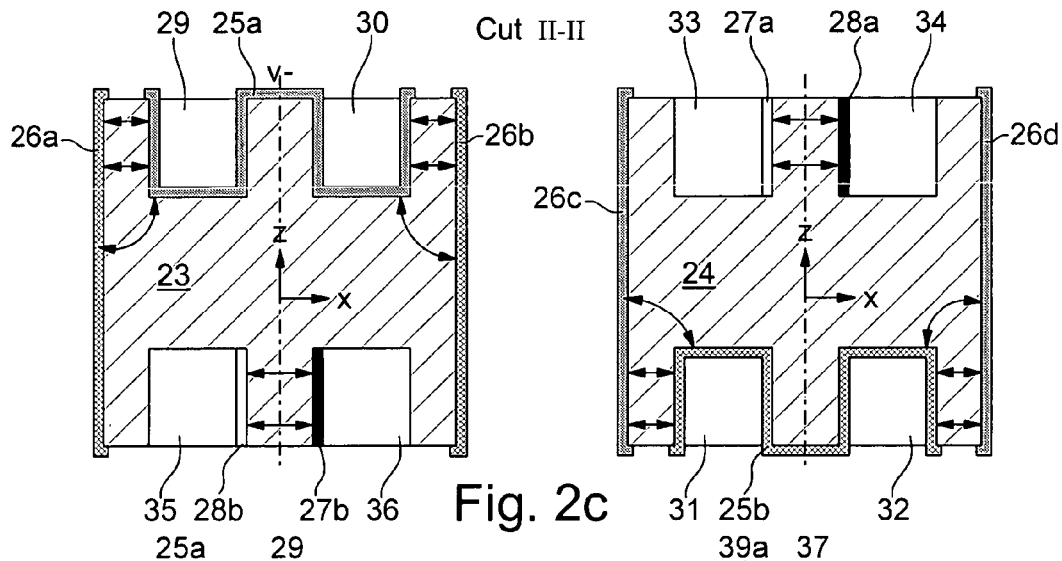
FIG. 2c is an enlarged transverse cross-section of the two legs of a tuning fork according to a variant of the first embodiment of the invention.
Figure 3:
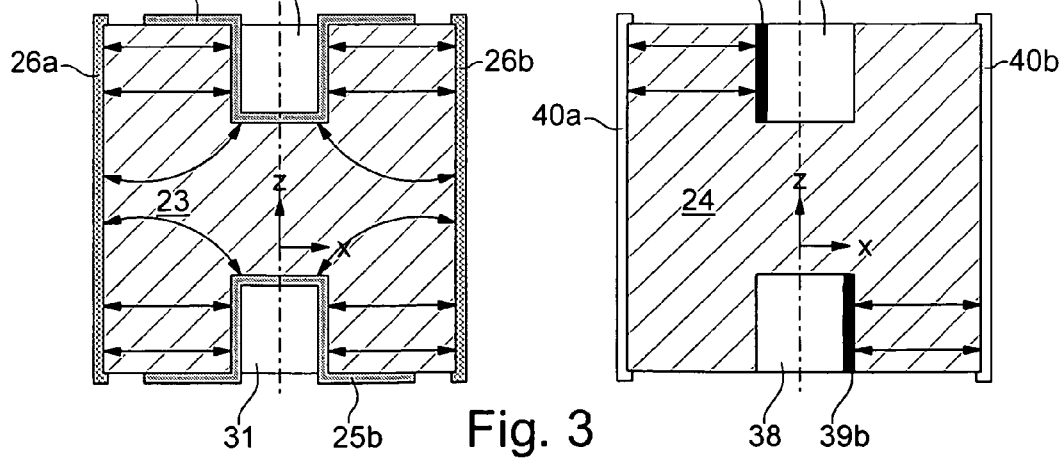
FIG. 3 is an enlarged transverse cross-section of the excitation and detection legs of a tuning fork according to a second embodiment of the invention.

It will be noted that in FIGS. 2c and 3 the description of which will follow, oscillator 4 41 and detector 42 have not been shown for the sake of simplification.

FIG. 2c shows a variant of the tuning fork described in relation to FIGS. 2a and 2b. This variant is based on a so-called crossed electrode tuning fork? In fact, the difference from the first previously explained embodiment concerns the inversion of a pair of excitation electrodes with a pair of detection electrodes. It will thus be understood that this type of tuning fork with crossed electrodes operates in the same way as the embodiment previously presented and thus has the same advantages.

Thus, according to this particular embodiment, the first leg 23 includes a first excitation electrode 25a arranged, for example, on the top face, so as to cover transversely grooves 29–30 and second 26a, respectively third 26b excitation electrodes, connected to a potential opposite to that to which the first electrode is connected, arranged over the entire thickness of one of the lateral faces, respectively over the entire thickness of the other lateral face of leg 23. This same leg 23 includes on its bottom face first 27b and second 28b detection electrodes arranged facing each other, the first electrode 27b being arranged on one of the lateral flanks of groove 35 and the second electrode 28b being arranged on one of the lateral flanks of groove 36, such that the electrical path between the two electrodes 27b and 28b is substantially rectilinear through leg 23.

The other leg 24 includes, in the same manner, on its top face, third 27a and fourth 28a detection electrodes arranged facing each other, the third electrode 27a being arranged on one of the lateral flanks of groove 33 and the fourth electrode 28a being arranged on one of the lateral flanks of groove 34, such that the electrical path between the two electrodes 27a and 28a is substantially rectilinear through leg 24. Leg 24 further includes, on its bottom face, a fourth excitation electrode 25b arranged so as to cover transversely grooves 31–32 and fifth 26c, respectively sixth 26d, excitation electrodes arranged over the entire thickness of one of the lateral faces, respectively over the entire thickness of the other lateral face, of leg 24.

FIG. 3 shows a tuning fork for a gyrometer according to a second embodiment of the invention. According to this embodiment, detection leg 24 has only one groove 37, 38 on each of the top and bottom faces. A first detection electrode 39a is arranged on one of the lateral flanks of groove 37 etched onto the top face of the detection leg and a second detection electrode 40a is arranged over the entire thickness of one of the lateral faces of the detection leg such that the electrical field between the two detection electrodes 39a and 40a is substantially rectilinear through detection leg 24.

The detection leg further includes a third detection electrode 39b arranged on one of the lateral flanks of groove 38 etched onto the bottom face of the leg and a fourth detection electrode 40b is arranged over the entire thickness of the second lateral face of the detection leg opposite the lateral face on which the second electrode 40a is arranged, such that the electrical field between the two detection electrodes 39b and 40b is substantially rectilinear through detection leg 24.

It will be noted that advantageously, as is shown in FIGS. 2b, 2c and 3, the piezoelectric tuning fork is a quartz whose main top and bottom faces are substantially perpendicular to the optical axis (z) of the quartz and in that the legs extend substantially along the mechanical axis (y) of the quartz.

It will be clear that various alterations and improvements obvious to those skilled in the art can be made to the various embodiments of the invention described in the present description, particularly it will be noted that the detection and excitation legs can be inverted, the excitation leg then being used as detection leg, and vice versa, that the mechanical uncoupling means can be used for each of the embodiments presented hereinbefore, that the so-called crossed electrode tuning fork solutions, in which pairs of excitation and detection electrodes are reversed between the two legs, are possible, without thereby departing from the invention defined by the annexed claims.

What is claimed is:

1. A transducer for measuring an angular velocity comprising:
    a single piezoelectric tuning fork that rotates at said angular velocity,
    said tuning fork including first and second vibrating legs extending from a base, each leg having two main top and bottom faces and two lateral faces,
    means for exciting a first vibration of the tuning fork, arranged on one of the two legs, called the excitation leg,
    means for detecting a second vibration of the tuning fork generated in response to said first vibration and to a rotation of the tuning fork, arranged on the other of the two legs, called the detection leg,
    wherein said detection leg includes at least one first groove on said top face and at least one second groove on said bottom face, said first and second grooves each having lateral flanks, and
    wherein said detection means include first and second detection electrodes arranged facing each other, the first detection electrode being arranged on one of the lateral flanks of said first groove, the second detection electrode being arranged such that the electrical field between the first and second detection electrodes is substantially rectilinear through the detection leg, and third and fourth detection electrodes arranged facing each other, the third detection electrode being arranged on one of the lateral flanks of said second groove, the fourth detection electrode being arranged such that the electrical field between the third and fourth detection electrodes is substantially rectilinear through the detection leg.

2. The transducer for measuring an angular velocity according to claim 1, wherein said detection leg includes a third groove on said top face and a fourth groove on said bottom face, said third and fourth grooves each having two lateral flanks, wherein said first detection electrode respectively said second detection electrode is arranged on one of the lateral flanks of the first groove, respectively the third groove, such that the electrical field between the first and second detection electrodes is substantially rectilinear through the detection leg, and wherein said third detection electrode, respectively fourth detection electrode, is arranged on one of the lateral flanks of the second groove, respectively fourth groove, such that the electrical field is substantially rectilinear between the third and fourth detection electrodes through the detection leg.

3. The transducer for measuring an angular velocity according to claim 2, wherein the excitation means include first, second, third and fourth excitation electrodes arranged respectively on the top, bottom and lateral faces of the excitation leg, wherein said excitation leg has at least one first groove on the top face, respectively one second groove on the bottom face of said excitation leg, and wherein said first excitation electrode is arranged so as to cover transversely the first groove, and said third excitation electrode is arranged so as to cover transversely said second groove.

4. The transducer for measuring an angular velocity according to claim 2, wherein the tuning fork is a tuning fork with crossed electrodes.

5. The transducer for measuring an angular velocity according to claim 3, wherein the turning fork is a turning fork with crossed electrodes.

6. The transducer for measuring an angular velocity according to claim 1, wherein the second detection electrode is arranged over the entire thickness of a first lateral face of the detection leg such that the electrical field between the first and second detection electrodes is substantially rectilinear through the detection leg, and wherein the fourth detection electrode is arranged over the entire thickness of the second lateral face of the detection leg opposite the first lateral face, such that the electrical field between the third and fourth detection electrodes is substantially rectilinear through the detection leg.

7. The transducer for measuring an angular velocity according to claim 1, wherein the piezoelectric tuning fork is a quartz whose main top and bottom faces are substantially perpendicular to the optical axis (z) of the quartz and wherein the legs extend substantially along the mechanical axis (y) of the quartz.

8. The transducer for measuring an angular velocity according to claim 1, wherein the base is provided with mechanical uncoupling means between a part for securing the base and the legs of the tuning fork.

* * * * *